Dec. 7, 1965    A. W. STORM ETAL    3,221,905
SHAFT FURNACE STOCKLINE FEEDER
Filed May 22, 1964    7 Sheets-Sheet 1
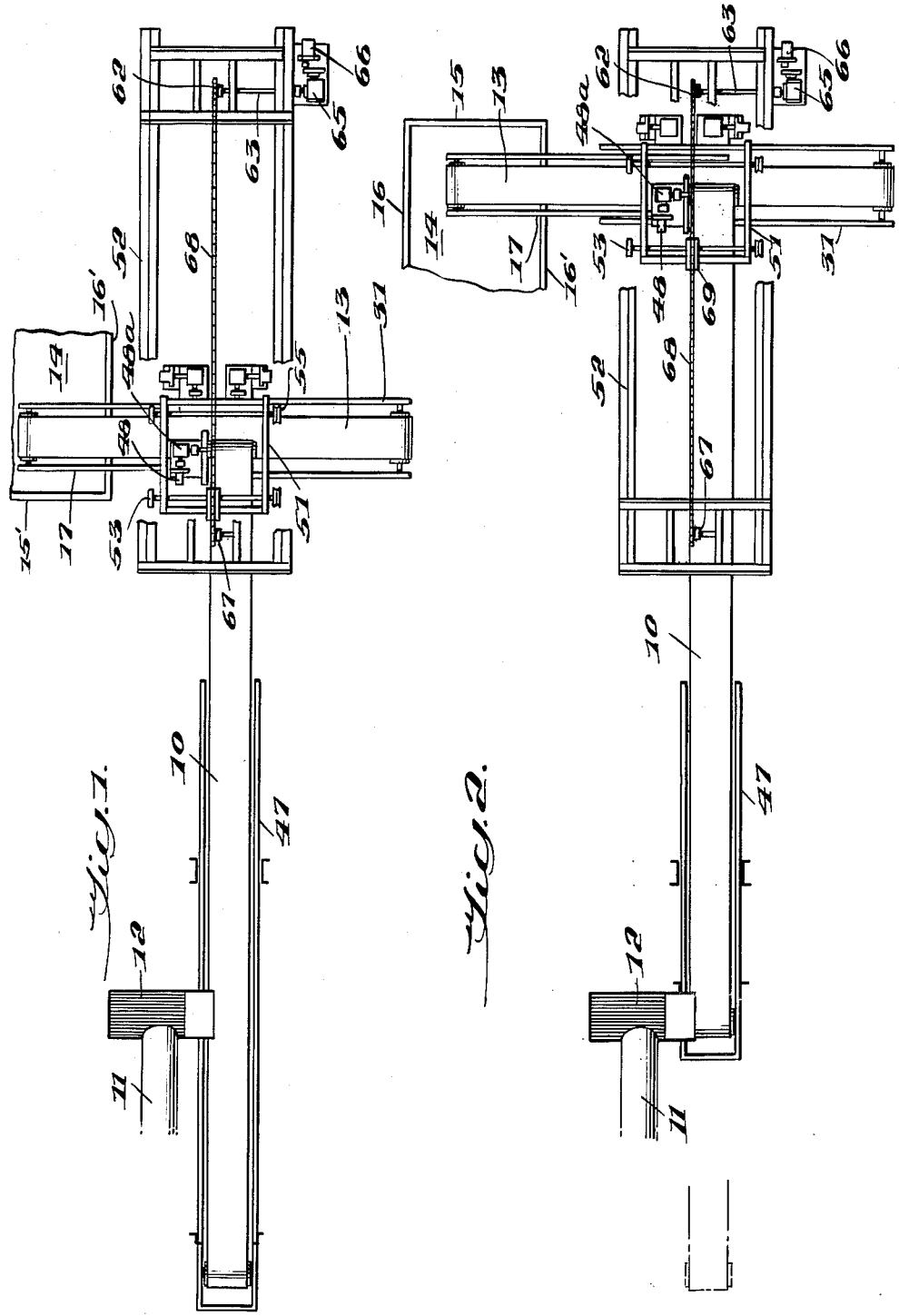
BY

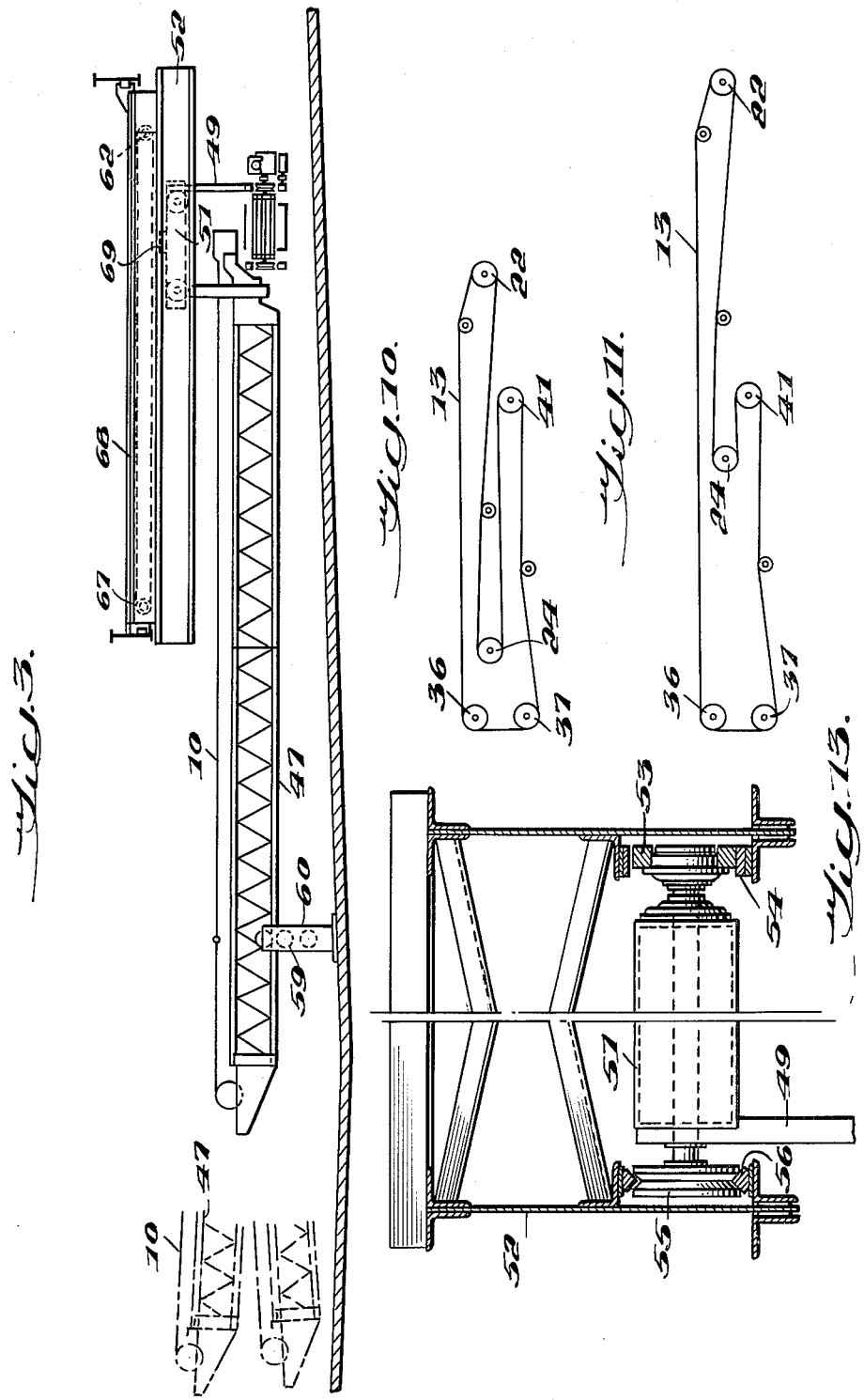

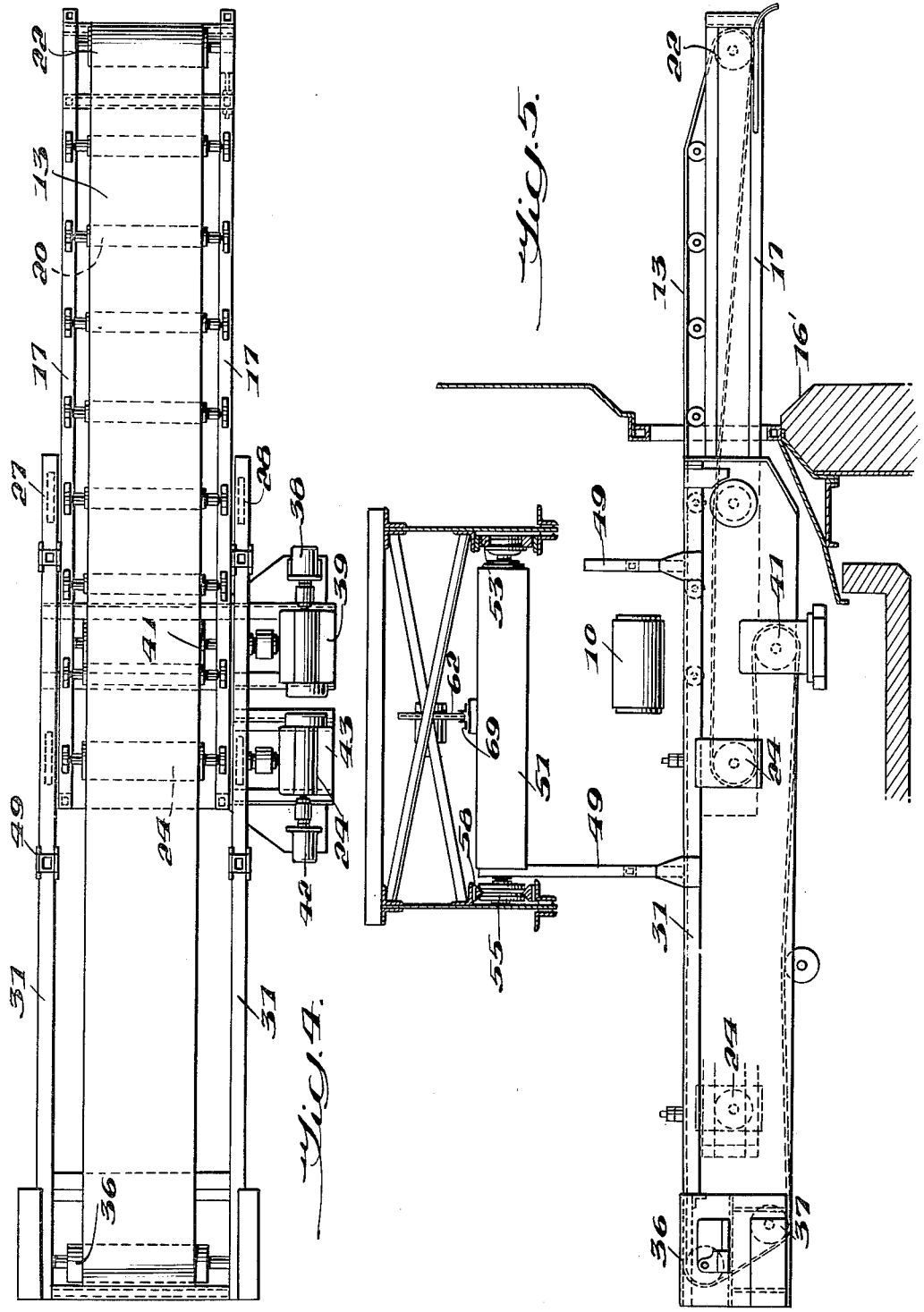

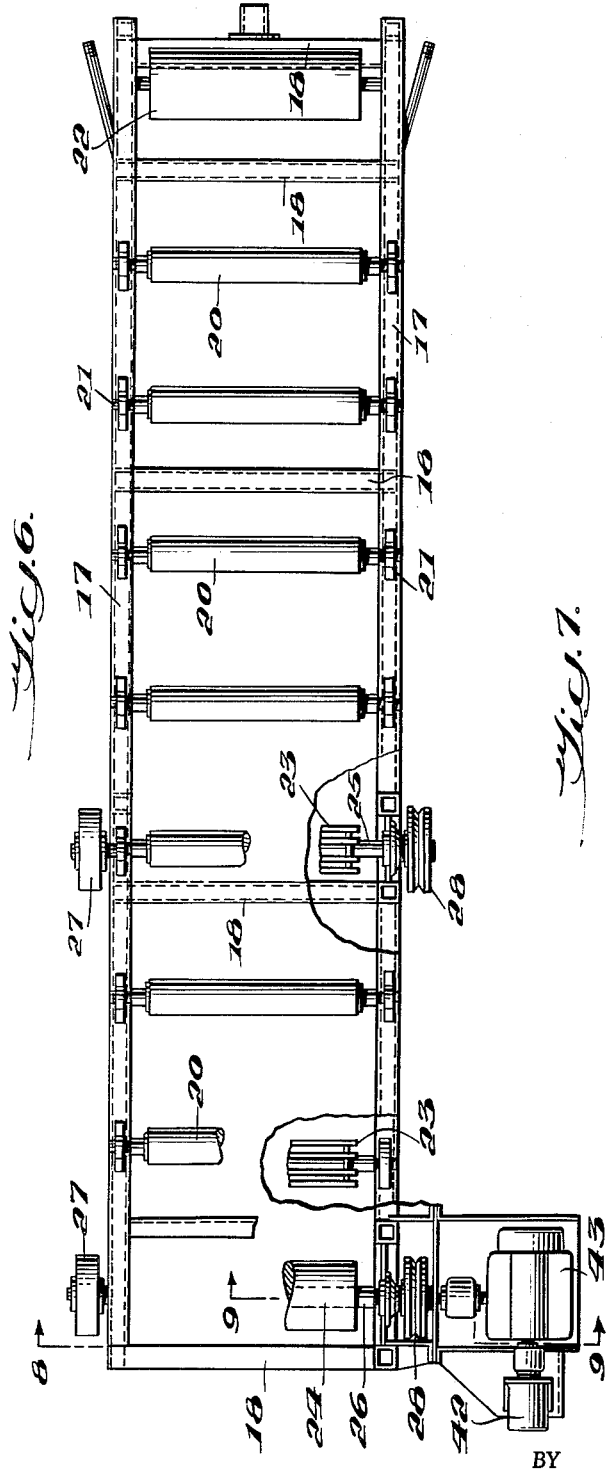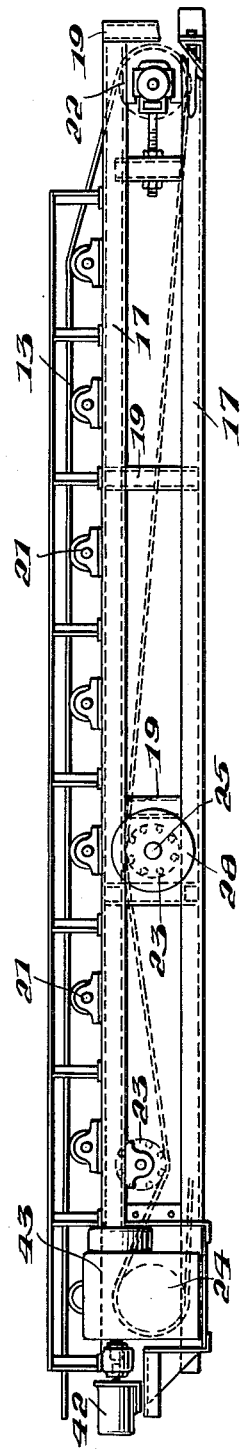

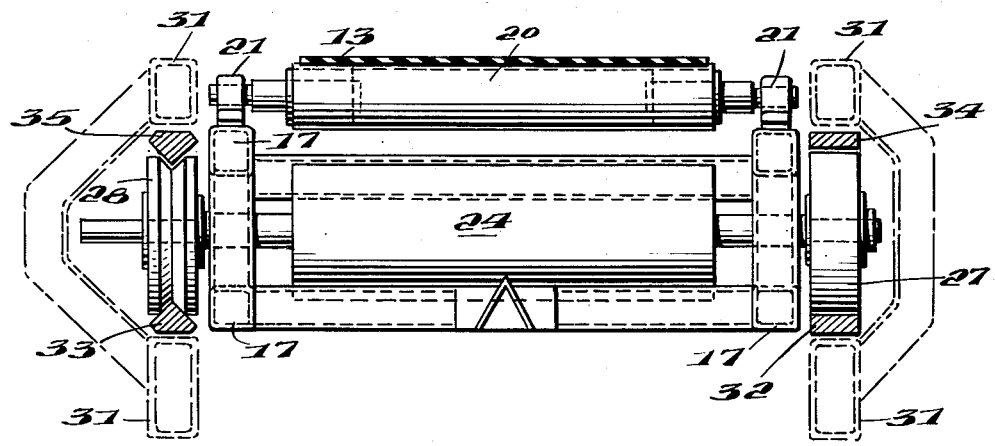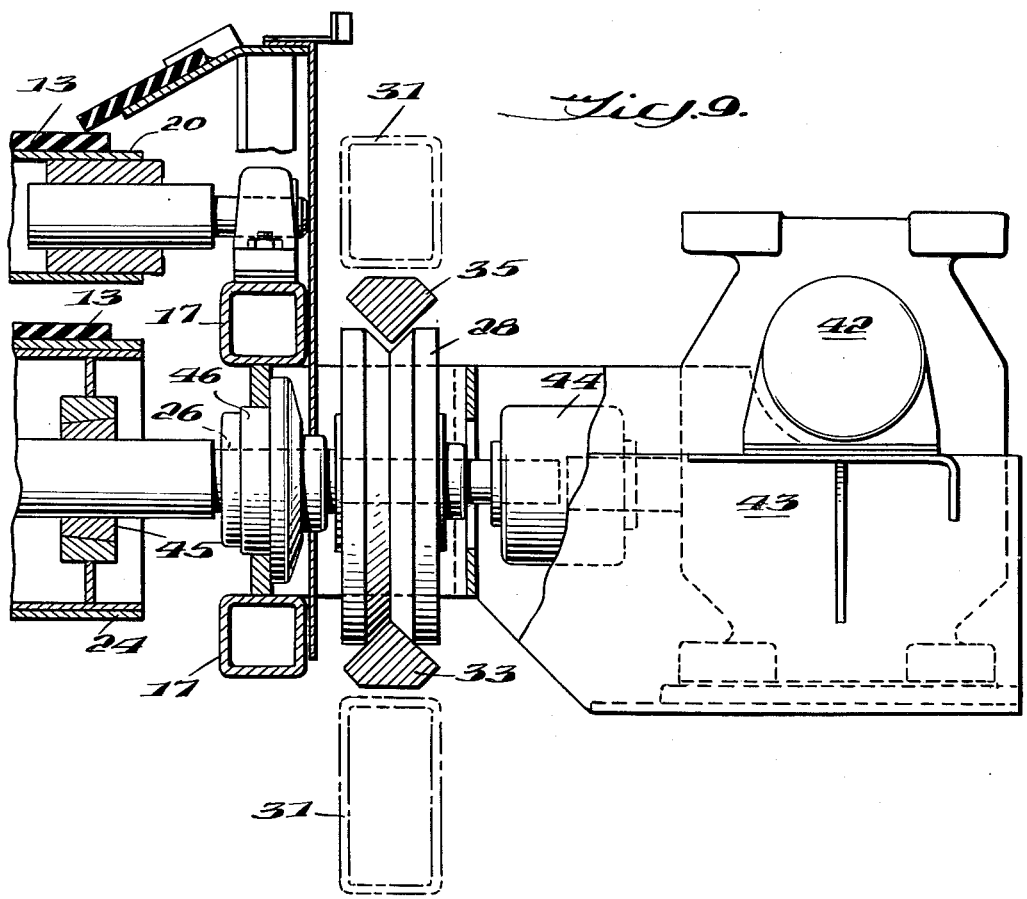

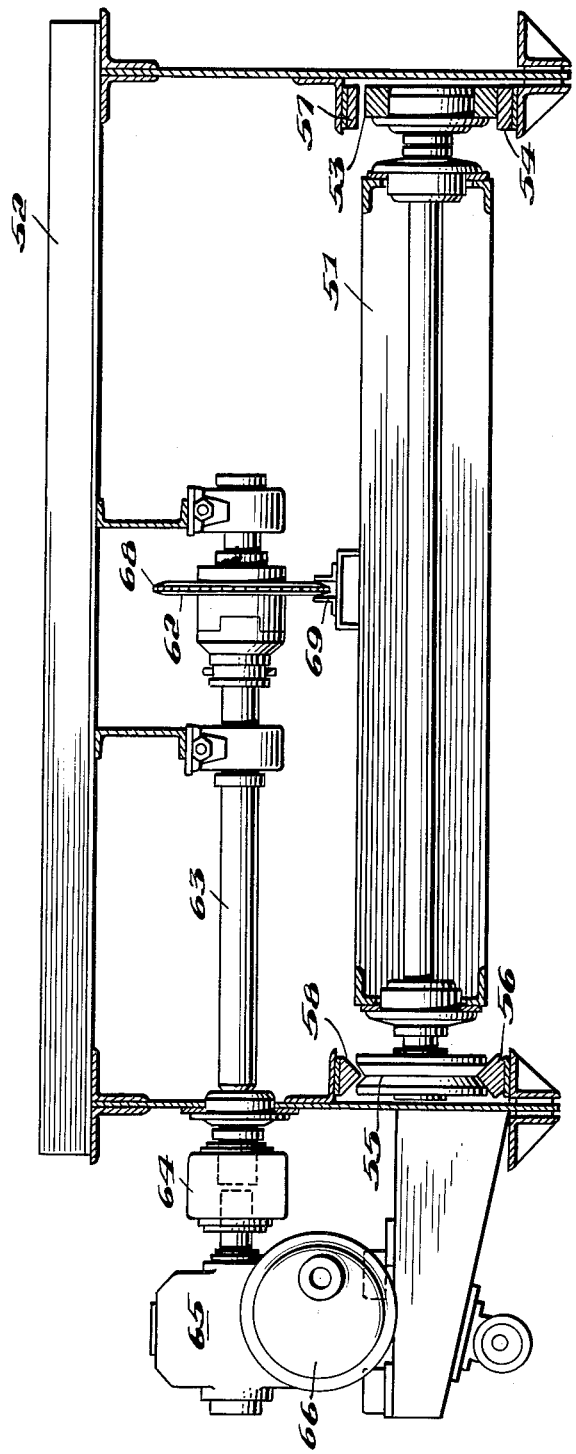

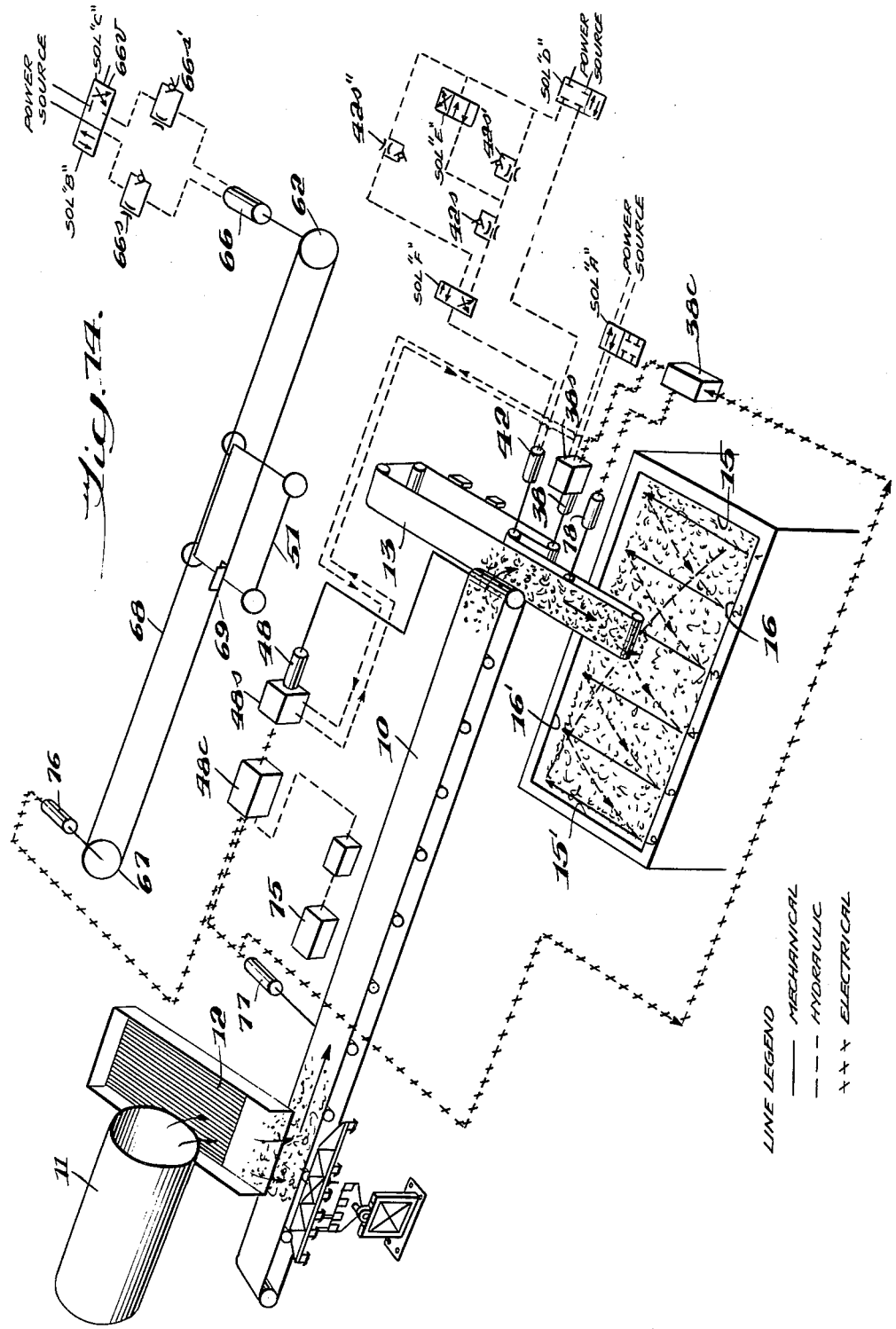

3,221,905
SHAFT FURNACE STOCKLINE FEEDER
Arthur W. Storm and Franklin G. Rinker, both of Toledo, Ohio, assignors to Midland-Ross Corporation, Toledo, Ohio, a corporation of Ohio
Filed May 22, 1964, Ser. No. 369,534
9 Claims. (Cl. 214—18)

This invention relates to the art of transporting and handling relatively fragile assemblages (pellets, nodules, briquets) of finely divided solids, and is particularly concerned with improvements in apparatus for conveying initially unheated or "green" balls, composed of finely divided solid materials, e.g. ore particles, from a device wherein the balls are being formed to indurating furnace and depositing the green balls on the surface a mass of similar balls contained in such indurating furnace. In the following description the invention will be described with specific reference to a feeder apparatus for transporting green balls of iron ore concentrates from the balling device (drum, cone, pan or the like) to, and depositing the green balls on, the stockline of a column of similar small balls undergoing induration treatment in a shaft-type indurating furnace having a rectangular mouth, of the general type shown in U.S. Patent No. 2,739,800 to Carl W. Sisco.

Apparatus for the handling of such fragile green balls heretofore had been described in, for instance, U.S. Patent No. 2,834,484 to DeVaney and Beggs, and its operability had been and still is being extensively demonstrated in large scale commercial application. Such apparatus, however, is massive and relatively very heavy, and hence, exerts very considerable inertia when started, stopped and directionally altered. Such inertial effects become important in cases where relatively rapid movements of the feeder apparatus are involved.

More particularly, the improved construction for the feeder stems from the need to accomplish a furnace feeding pattern comprising a relatively large number, e.g. six or more passes, or reciprocations of the index belt from the end of which discharge of the fluent material onto the stockline takes place, in a direction normal to the longer dimension of a rectangularly shaped furnace mouth. To achieve a feeding pattern of this type within the time allotted for a single cycle, as contrasted with a hereto employed feed pattern involving only two such passes normal to the shorter dimension, the invention provides a considerable reduction in the overall mass of the shuttle structure which must be reciprocated.

Accordingly, it is an object of the present invention to provide a feeder apparatus, of the general type above mentioned, having a mass which is significantly less than that of the aforesaid feeder apparatus and particularly lighter as regards those parts (of the feeder as a whole) which are subject to faster motion.

A specific object of the invention is to provide a feeder apparatus adapted to follow a complicated pattern of stockline feeding, in each cycle of which pattern a part of the apparatus is relatively rapidly reciprocated, across the top opening of a shaft-type indurating furnace, in a large number of generally parallel paths spaced along the length of the furnace opening and then quickly returned to the locus of the beginning of the cycle for a repetition of the pattern.

Another inventive object is to provide a feeder apparatus, of the above general type, wherein speed compensation—as between the index belt and the shuttle belt—ensures the deposition of a uniformly thick layer of product loading on the index belt.

Another specific object is to provide an improved apparatus for feeding the stockline of a vertical shaft type furnace which comprises a shuttle belt and related support structure arranged parallel to one side of the mouth of the furnace, the shuttle belt receiving the fluent material from a suitable source such as the output of a balling drum or the like, and an extendable index belt and related support structure arranged at the discharge end of the shuttle belt and transversely of the latter for discharging the material onto the stockline, the support structure for the index belt being extendable and comprised of two parts, only one of which, together with the appertaining part of the index belt, is arranged for a back and forth movement across the mouth of the furnace. This improved arrangement decreases considerably the overall mass and inertia of the feeder parts which are required to be moved and hence, increases the response characteristic of the feeder.

A further specific object of the invention is to provide an improved stockline feeder as described in the preceding paragraph and which includes the further feature of an overhead type of travelling support for the discharge end of the shuttle belt and its related frame structure together with the entire index belt assembly which facilitates movement of the shuttle and index belts together with their support structures as a unit along one side of the furnace mouth.

Still another object is to provide an improved stockline feeder as described in the preceding paragraph and which includes unique means for adjusting the height of the shuttle belt at the end opposite the discharge end thus enabling one to adjust the longitudinal attitude of the shuttle belt so as to be horizontal, or inclined upward or downward as regards the direction of travel of the fluent material thereon.

The foregoing as well as other objects and advantages inherent in the invention will become more apparent from the following detailed description of a preferred embodiment of the invention together with the accompanying drawings in which:

FIG. 1 is a top plan view of the stockline feeder showing the general arrangement of the shuttle and index belts and their supporting structures in relation to the mouth of the shaft furnace and with the index belt in position at one end of the furnace mouth;

FIG. 2 is also a top plan view similar to FIG. 1 but showing the index belt in position at the opposite end of the furnace mouth;

FIG. 3 is a general view in side elevation of the shuttle and index belts and their overall support structure;

FIG. 4 is a top plan view of the index belt and its two part extendable supporting frame structure;

FIG. 5 is a view in side elevation of the index belt and its two part supporting frame structure together with a view in transverse section of the traveling overhead support structure by means of which the shuttle and index belts and their respective supporting frames can be shifted as a unit longitudinally of one of the longer sides of the rectangular furnace mouth;

FIG. 6 is a view in top plan of the movable frame part of the support structure for the index belt, the belt itself being eliminated from this view;

FIG. 7 is a view in side elevation of the structure shown in FIG. 6, the index belt being included;

FIG. 8 is a view in transverse section taken on line 8—8 of FIG. 6;

FIG. 9 is a transverse section taken on line 9—9 of FIG. 6;

FIG. 10 is a view of the complete index belt showing the extendable part thereof in its rearmost position;

FIG. 11 is a view similar to FIG. 10 but with the extendable part of the index belt in its foremost position;

FIG. 12 is a view in transverse section near one end of the overhead support structure for the shuttle and index belt frames, this view showing the motor mechanism for the drive sprocket by which the overhead supporting carriage is shifted back and forth on its trackway;

FIG. 13 is also a view in transverse section similar to FIG. 12; and

FIG. 14 is a schematic view in perspective illustrating the entire feeder mechanism and the related controls.

With reference now to the drawings, and to FIGS. 1 to 3 and 14 in particular, it will be seen that the stockline feeder for the furnace is comprised generally of a shuttle belt 10 which, at one point therealong, e.g. towards the rear end, receives the fluent material, in this case, "green" balls of ore particles which are balled up in a balling drum 11, the balls being discharged from the drum onto an inclined screen 12 from which they are transferred to the upper flight of the shuttle belt 10. The "green" balls are carried forward on the shuttle belt to the discharge end from which they are transferred onto an index belt 13 arranged normal to the longitudinal axis of the shuttle belt. The balled material deposited on index belt 13 is, in turn, carried forward to the discharge end thereof from which it is then discharged onto the stockline at the mouth of the vertical shaft furnace. Only the mouth 14 of the furnace is shown in the drawings, and this is seen to have an elongated rectangular configuration. The shorter sides 15, 15' of the furnace mouth are oriented parallel with the longitudinal axis of the index belt, and the longer sides 16, 16' of the mouth are oriented parallel with the longitudinal axis of the shuttle belt.

As shown in FIG. 14, the feed pattern is comprised of a series of parallel spaced passes between the two longer sides of the furnace mouth, the balled material being delivered from the discharge end of the index belt onto the stockline as that end of the belt is given a movement in translation from the far side 16 to the near side 16' of the mouth. Consecutive parallel passes of the index belt are numbered 1–6, and are indicated by the solid arrowed lines. Each time the discharge end of the index belt reaches the near side 16' of the furnace mouth, it is returned to the far side 16 along a curved path indicated by the dashed arrowed lines. After each set of six passes has been completed, the discharge end of the index belt will have reached a position near one corner of the mouth denoted by the junction of adjacent walls 15', 16'. The discharge end of the index belt is then returned to its starting position at the diagonally opposite corner along the curved path indicated by the dashed arrow line.

It will thus be evident that the feed pattern depicted in FIG. 14 requires the leading, discharge end of the index belt 13 to shift longitudinally of itself as well as parallel to itself. As has been previously stated, one of the principal objects of the invention is to provide an improved construction and support for the index belt such that considerably less inertia is involved in shifting the discharge end of the index belt longitudinally of itself. In order to accomplish this, the index belt is trained over an extendable frame assembly which comprises two principal frame parts, one part of the frame being stationary in relation to the supporting frame structure for the shuttle belt, and the other frame part being mounted on the first mentioned one for a reciprocating movement. This movable frame part which thus can be extended and retracted with respect to the mouth of the furnace carries the leading, discharge end of the index belt, and hence, the mass of the movable parts of the index belt assembly is reduced considerably from that entailed in prior constructions as typified by the prior-mentioned U.S. Patent No. 2,834,484.

In particular, the movable part of the supporting frame structure for the index belt, shown best in FIGS. 1, 2 and 4–9, is comprised of parallel spaced, longitudinally extending upper and lower box girders 17 which establish an elongated rectangular frame structure, the longitudinal girders 17 being held in their proper positions by a plurality of horizontal cross frame members 18 and vertical members 19. Extending transversely between the upper box girders 17 are a plurality of parallel spaced rolls 20 mounted for rotation in suitable bearings 21, the rolls 20 serving to guide and support a part of the upper flight of the index belt 13. The leading portion of the upper flight of the index belt passes over the guide rolls 20 to and around the discharge roll 22, thence rearwardly and over and under slatted rolls 23 to the roll 24 mounted at the rear of the movable frame structure.

The movable frame part of the index belt assembly is also provided with two sets of longitudinally spaced wheeled axles 25, 26. The two wheels 27 at one end of each axle are provided with cylindrical rims and the rims of the two wheels 28 at the opposite ends of axles 25, 26 have a grooved periphery.

The relatively stationary frame part of the index belt assembly is similarly comprised of parallel spaced longitudinally extending upper and lower box girders 31 which likewise establish an elongated rectangular frame structure. Supported by the lower girder 31 at one side of the frame is a longitudinally extending flat rail 32 for receiving the wheels 27 at the corresponding side of the movable frame part, and supported by the lower girder 31 at the opposite side of the frame is a longitudinally extending V-shaped rail 33 for receiving the wheels 28 at the opposite side of the movable frame part. Similarly configured rails 34, 35 extend beneath the upper girders 31. These upper rails do not normally engage the wheels 27, 28 but are provided to limit any upward play of the movable frame part.

The relatively stationary frame part of the index belt assembly carries at its rear end upper and lower rolls 36, 37 around which extend the rearmost portion of the index belt 13. This frame part also includes a power unit, preferably in the form of an hydraulic motor 38 and related transmission 39, the output from the latter being applied to a drive roll 41 around which a portion of the lower flight of the index belt 13 extends.

For actuating the movable frame structure of the index belt assembly there is provided a drive unit secured to this structure which, in the illustrated embodiment is consituted by an hydraulic motor 42 and related transmission unit 43, the output from the latter being applied through a coupling 44 to the axle 26 on which a rear set of idler wheels 27, 28 and sleeve type hub 45 for roll 24 are mounted. Idler wheels 27, 28 are rotatably mounted on this axle which passes through bearings 46 located at each side of the frame. The hub sleeve 45 for roll 24 is keyed to this axle. Consequently, as motor 42 is operated, power from the transmission unit 43 will be applied to the roll 24.

Reverse motion of the index frame occurs when roll 24, which is keyed to shaft 26, is driven at a peripheral speed greater than the peripheral speed at which roll 41 is driven, thereby withdrawing the frame from above the furnace mouth. Roll 41 is driven at a modulated speed automatically controlled in response to the speed of shuttle belt 10. Forward motion of the index frame occurs when roll 24 is braked and roll 41 is continued to be driven. Thus, index belt 11 itself is the traction means. Thus, short quick alternate forward and reverse motions are accomplished without the use of a reversing motor and problems of synchronizing the speeds of two (2) motors on the forward motion are avoided. Roll 41 as depicted in FIG. 5 rotates in a clockwise direction at a modulatable rotatable velocity. Roll 24 rotates in a counterclockwise direction at a rotational velocity less than that of 41, preferably a velocity of zero (for index in) or equal to 41 (static position of extensible index frame) or greater than (e.g., twice that of) the velocity of 41 (for index out).

The aforesaid braking action may be effected by the driving means for roll 24, which driving means may—as illustrated—be an hydraulic (or pneumatic) motor such as 42 or it may be an electric motor (not illustrated) associated with a conventional brake device.

The reciprocatable drive mechanism for the movable frame structure of the index belt assembly is self-compensating so far as concerns the change in length of the upper flight of the index belt as the frame is shifted in and out with respect to the mouth of the surface. This will be apparent from a comparison between FIGS. 10 and 11, which show the index belt in the "in" and "out" positions respectively. As the movable frame part and leading end of the index belt shifts back and forth, the drive roll 41 for the belt remains stationary as do also the upper end lower guide rolls 36, 37 at the rear end of the stationary frame part. However, a loop in the belt passes around roll 24 connected to the index frame through bearing 46 at the rear end of the movable frame structure and accordingly the movable frame structure shifts back and forth in the same direction so as to provide the exact amount of take-up and let-out in the belt loop as is necessary to accommodate movement of the frame structure and also maintain a uniform tension in the belt.

In order to feed the stockline with pellets discharged onto the shuttle belt it has been explained that the index belt must be able to undergo a reciprocating motion so as to reach across the width of the furnace mouth. In addition to this movement, the entire index belt assembly must be transported parallel to itself so as to travel for the length of the furnace mouth. In accordance with the invention, this is accomplished by an overhead type of traveling suspension which is shown in FIGS. 1–3, 5, 12, 13 and 14. The discharge end of the shuttle belt together with its supporting frame 47 and belt drive hydraulic motor unit 48, and the entire frame structure of the index belt assembly are carried at the lower ends of four vertical columns 49 which depend from the four corner parts of a two-axled rectangular carriage 51 which is arranged for a reciprocating movement along an overhead frame structure 52 which provides parallel spaced trackways for the wheels of the carriage. The peripheries of the wheels 53 at one side of the carriage 51 have cylindrical running surfaces and roll on a flat rail 54. The wheels 55 at the opposite side of the carriage have grooved peripheries and roll on a profiled rail 56. Similarly configured rails 57, 58 located above the carriage wheels do not normally engage these wheels but are provided to limit upward play of the carriage.

The carriage 51 is arranged to move along a path parallel to the longitudinal axis of the shuttle belt and it will be noted from FIG. 3 that the rear support for the shuttle belt supporting frame 47 is a rolling one, there being a roll 59 set into a stand 60 at one of three different heights in order to vary the height of the rear end of the shuttle belt and so adjust its attitude. In the position shown in FIG. 3, roll 59 lies at the middle position and establishes a rolling engagement with the underside of the shuttle belt frame 47, the position of the roll being such that the shuttle belt has a generally horizontal attitude. Two other positions are possible as shown at the left end of FIG. 3. With the roll 59 set in the lowermost position, the shuttle belt will be inclinde slightly upward in the direction of pellet feed along the belt. With the roll set in the uppermost position, the shuttle belt will be inclined slightly downward in the direction of pellet feed along the belt.

For effecting the back and forth movement of the overhead carriage 51 any suitable type of drive can be utilized. In the illustrated embodiment, a sprocket-and-chain type of drive is employed. A drive sprocket 62 is mounted at one end of the overhead structure on a horizontally mounted drive shaft 63 which at one end is drivingly connected through a coupling 64 to the output shaft of the transmission unit 65 powered by hydraulic motor 66. This is shown particularly well in FIG. 12. A driven sprocket 67 is mounted at the opposite end of the overhead support structure 52 and a sprocket chain 68 extends between the two sprockets. The carriage 51 is secured to sprocket chain 68 at one point along the lower flight of the chain at an anchor fitting 69 and consequently carriage 51 will be caused to move in one direction or the other along the overhead structure 52 depending upon the direction in which sprocket chain 62 is driven.

Referring now to FIG. 14, it will be seen that there are, basically, four drives in the apparatus. Of these 66 is the shuttle car drive, forward and reverse. This drive, which moves both shuttle conveyor and index conveyor back and forth, may, as illustrated, be an hydraulic motor or it may take the form of a reversible electric motor. In the case in which 66 is an hydraulic motor, we may actuate the same by means of a multi-directional valve such as the blocked center, four-way, valve illustrated at 66v. Composite flow control and check valves 66s may—as shown—be interposed in the hydraulic lines from valve 66v to shuttle car drive 66, providing controlled flow of fluid to motor 66 with free flow therefrom.

Hydraulic motor unit 48, receiving hydraulic fluid from a power source (diagrammatically shown), drives shuttle conveyor belt 10 (see FIG. 1) through a transmission device 48a (FIGS. 1–3). A servo valve 48s serves to modulate the rotative velocity of motor unit 48 in accordance with an electrical command signal transmitted by a servo amplifier controller 48c.

Reference supply voltage means 75 establishes the fundamental rotational velocity of motor 48 through servo amplifier controller 48c and servo valve 48s.

Tachometer 76 interposes a voltage, proportional to the linear velocity of carriage 51, on the reference supply voltage in servo amplifier controller 48c to modulate servo valve 48s and, consequently, the rotational velocity of motor 48, the polarity of the feed-back voltage from tachometer 76 representing the direction of travel of carriage 51. Hence, the algebraic sum of the voltages increases or decreases the rotational velocity of hydraulic motor 48 above or below the reference rotational velocity.

Shuttle belt feed-back tachometer 77 is driven by shuttle belt 10. The algebraic sum of the voltages generated by shuttle belt feed-back tachometer 77 plus that voltage which is generated by the shuttle carriage tachometer 76 must always equal the reference voltage as established at 75. The servo amplifier controller 48c reacts to position servo valve 48s to accomplish this by, in effect, varying the speed of the belt 10 which variation affects the output at 77 to balance the net feed-back signal (76 plus 77) with the reference signal from voltage supply means 75.

As regards the index belt drive and index belt frame drive, the signal from tachometer 77 becomes the reference supply voltage means for index belt servo amplifier 38c, which latter impresses control on hydraulic motor 38, which hydraulic motor drives index belt 13 through servo valve 38s.

A tachometer 78, driven by belt 13, generates a feed-back signal which is transmitted to amplifier 38c. As will thus be seen, the linear velocity of belt 13 with respect to the linear velocity of shuttle car frame 51 will always be an integer multiple of the linear velocity of belt 10.

It is to be understood that hydraulic power may be, and preferably is, supplied to the illustrated portions of the system, from a suitable source of hydraulic power, through a solenoid valve represented at "Sol. A."

Control over the longitudinal movement of index frame 17 is effected as follows. Hydraulic motor 42, operating at rotational velocities of zero or equal to or greater than—but in opposite direction to—that of motor 38, establishes the direction and the velocity of index frame motion. If the velocity of hydraulic motor 42 is less than that of 38 (e.g., zero), the index frame will be translated into the furnace hood; if its rotational velocity is equal to that of 38, the index frame will remain stationary with respect to the furnace hood; and if the rotational velocity of hydraulic motor 42 is greater than that of 38, the index frame will be withdrawn from the furnace hood. These speed changes are accomplished by means of a system incorporating flow control valves 42s, 42s' and 42s'' and multi-directional valves "Sol. D," "Sol. E" and "Sol. F." To obtain zero velocity of motor 42 solenoid "D" is blocked. For motion, solenoid "D" is energized "open" to permit flow of fluid through motor 42 and return through one or two control valves dependent upon the positions of solenoids "E" and "F." Solenoid "F" provides for return flow through either flow control valve 42s or 42s,'' while solenoid "E" provides for return flow through control valve 42s'. Valve 42s provides for a low, valve 42s' for a fast, and valve 42s'' provides for a substantially equal, total velocity with respect to the rotational velocity of motor 38. Solenoid "E" selects either valve 42s or valves 42s and 42s' depending upon a signal derived from a bed level probe (not shown herein but described and illustrated in Patent No. 2,646,900, Carl Sisco), whereby to tend to maintain optimum uniformity in stockline profile.

We claim:

1. The combination with a vertical shaft furnace having a substantially rectangular mouth, of means for feeding fluent material onto the stockline in the furnace mouth, said feeding means comprising a shuttle belt and associated supporting frame structure disposed parallel to one side of the furnace mouth, means for driving said shuttle belt, an extendible index belt and associated extendible supporting frame structure disposed at the discharge end of said shuttle belt and transversely of the latter for receiving the fluent material discharged from said shuttle belt and discharging the same onto the stockline, means for driving said index belt, said extendible supporting frame structure for said index belt including a first frame part which is stationary in relation to said supporting structure for said shuttle belt, a second frame part supporting the forward discharge end of said index belt, and means supporting said second frame part and the discharge end of said index belt on said first frame part for reciprocating movement longitudinally of the latter, drive means for reciprocating said second frame part, means supporting said shuttle and index belts and their respective supporting frame structures for reciprocating movement as a unit longitudinally of said side of the furnace mouth, said supporting means being comprised of an elevated trackway arranged parallel with said shuttle belt, a carriage on said trackway and support means depending from said carriage and which serve to carry the discharge end of said shuttle belt and the appertaining forward end of said shuttle belt support structure as well as said index belt and its associated supporting frame structure; and drive means for effecting said unitized reciprocating movement of said shuttle and index belts and their respective supporting frame structures.

2. Apparatus as defined in claim 1 for feeding fluent material onto the stockline of a vertical shaft furnace and which further includes a roller type of support for the rear end of said frame structure for said shuttle belt.

3. Apparatus as defined in claim 2 for feeding fluent material onto the stockline of a vertical shaft furnace wherein said roller type support for the rear end of said frame structure for said shuttle belt is comprised of an upright roll stand, and roll means on said stand engageable with the underside of said frame structure.

4. Apparatus as defined in claim 3 for feeding fluent material onto the stockline of a vertical shaft furnace and which further includes means for adjusting the height of said roll means to thereby effect a corresponding adjustment in the attitude of said frame structure and the shuttle belt which it supports.

5. Apparatus as defined in claim 1 wherein said drive means for effecting reciprocating movement of said shuttle and index belts and their respective supporting frames structures as a unit are comprised of a chain and sprocket drive for said carriage including sprockets rotatably mounted at opposite ends of said trackway, reversible drive means for driving one of said sprockets in first one direction and then the other, a sprocket chain extending between said sprockets and means anchoring said carriage at one point along said sprocket chain.

6. Apparatus as defined in claim 1 for feeding fluent material onto the stockline of a vertical shaft furnace wherein said first relatively stationary part of said supporting structure for said index belt includes parallel spaced rails for receiving a plurality of sets of longitudinally spaced idler wheels rotatably mounted on said second frame part to accommodate reciprocating movement of the latter, and said drive means for reciprocating said second frame part comprises two drive pulleys rotating in opposite directions, one of which is attached to the stationary part and the other of which is attached to the moving part.

7. Apparatus as defined in claim 6 for feeding fluent material onto the stockline of a vertical shaft furnace wherein one of said sets of idler wheels is rotatably mounted on a drive axle mounted in bearings located at the rear end of said second frame part and which further includes a guide roll secured to said axle, the part of the lower flight of said index belt at the rear end of said second frame part being carried around said guide roll and thence forwardly to and around a drive roll for said index belt, and which is rotated by said drive means therefor, said drive roll being mounted for rotation on a stationary axis.

8. Apparatus as defined in claim 6, further characterized in that one of said drive pulleys is adapted to rotate alternately at different rotational velocities one of which is less than the rotational velocity of the other drive pulley and another of which is greater than the rotational velocity of said other drive pulley.

9. Apparatus as defined in claim 8, characterized in that the rotational velocity of said one drive pulley is variable between zero and greater than the rotational velocity of said other drive pulley.

References Cited by the Examiner

UNITED STATES PATENTS

| 2,166,447 | 7/1939 | Ruppenthal | 198—139 |
| 2,834,484 | 5/1958 | De Vaney et al. | 214—18 |

GERALD M. FORLENZA, *Primary Examiner.*